United States Patent [19]
Mattson

[11] 4,076,015
[45] Feb. 28, 1978

[54] SOLAR ENERGY COLLECTOR

[76] Inventor: John P. Mattson, 123 Lake Shore Drive, Duxbury, Mass. 02332

[21] Appl. No.: 649,033

[22] Filed: Jan. 14, 1976

Related U.S. Application Data

[63] Continuation-in-part of Ser. No. 621,759, Oct. 14, 1975, abandoned.

[51] Int. Cl.$^2$ .............................................. F24J 3/02
[52] U.S. Cl. ...................................... 126/271; 126/270
[58] Field of Search ................. 126/270, 271; 60/641; 237/1 A; 350/288, 299, 293

[56] References Cited

U.S. PATENT DOCUMENTS

| 921,976 | 5/1909 | Glass | 126/271 |
|---|---|---|---|
| 2,213,894 | 9/1940 | Barry | 126/271 |
| 2,625,930 | 1/1953 | Harris | 126/270 |
| 3,244,186 | 4/1966 | Thomason et al. | 126/270 |
| 3,985,116 | 10/1976 | Kapany | 126/270 |

Primary Examiner—Kenneth W. Sprague
Assistant Examiner—James C. Yeung
Attorney, Agent, or Firm—Edward A. Gordon

[57] ABSTRACT

An apparatus for collecting radiant solar energy upon an energy receiving surface comprising a solar energy collecting module having a base and a plurality of radiant energy collector module units angularly disposed to said base. The collector units consist of a raised surface or surfaces transparent to incident solar energy. The configuration and angles of the collector module unit surfaces with respect to the base and the energy receiving surface are varied to provide optimum collection of solar radiation. The invention also provides for a plurality of reflective surfaces angularly disposed to the base and energy receiving surface where a combination of transparent and reflective surfaces provide for optimum collection of radiant energy. The reflective surfaces are angularly disposed to the base to reflect incident radiant energy to an adjacent transparent surface for transmission to the energy receiving surface.

5 Claims, 10 Drawing Figures

SOLAR ENERGY COLLECTOR

This application is a continuation-in-part of my co-pending application Ser. No. 621,759 filed Oct. 14, 1975, abandoned.

BACKGROUND OF THE INVENTION

1. Field of the Invention

This invention relates to an apparatus for collecting radiant solar energy and more particularly to a solar energy collector which can be attached to a surface or structure without regard to direction or angle of the surface or structure upon which the collector is positioned.

2. Description of the Prior Art

There have been numerous systems proposed for the utilization of solar energy which generally comprise a collector unit which directs solar energy on an energy receiving means which may be an evaporator unit or a conduit for a heat exchange medium. Unlike conventional fuel burning systems, such solar devices provide a non-polluting source of usable energy. In many prior art systems large black aluminum collectors absorb the sun's energy beneath rigid sheets of plastic. In these systems the flat sandwich-like assembly is positioned to be aimed due south and tilted at an angle of 45°. While such flat solar energy collector assemblies can be installed on an existing building with a flat roof surface, it is not readily adaptable to existing structures having inclined roofs and are particularly not suitable for inclined roofs which run in a generally east-west direction, for example, since they are then unable to utilize the total solar energy available. In such instances installation may require the giving up of land around the building. For the home-owner the giving up of land may be too high a price to pay for lower heating costs.

In other prior systems one or more reflector units are mounted on a framework which changes its inclination in dependence upon the elevation of the sun, thereby assuring that the reflected solar energy will always be directed at the energy receiving means. These previous systems impose severe restrictions on the size of the reflector assembly since it must be capable of swinging movement in a vertical plane.

In other prior systems frames have carried a plurality of individually inclinable reflector units of parabolic cross-sections with each reflector unit having its own energy receiving means located at the focus of the parabola. In still other prior systems there is provided a single energy receiving means which receives reflected solar energy from a plurality of individually inclinable reflector units.

The foregoing prior art, while providing solar energy collectors, do not provide a solar energy collector which is readily adaptable to a surface which points substantially in any direction and at optimum angles to horizontal or level while still providing effective collection of radiant solar energy.

It is, therefore, the desire of this invention to provide an apparatus for collecting radiant solar energy which is readily adaptable to a surface which points in substantially any direction and inclined at optimum angles to horizontal or level while still providing effective collection of radiant energy.

It is also desirable to provide a radiant solar energy collector which provides structural rigidity and lightweight construction.

It is also desirable to provide a radiant solar energy collector capable of simple modular construction, stylish in appearance, which can be installed on existing roofs regardless of location or pitch.

SUMMARY OF THE INVENTION

This invention relates to an apparatus for collecting radiant solar energy and more particularly to the radiant solar energy collector and the structure of modular units.

In accordance with the present invention there is provided an apparatus for collecting radiant solar energy upon an energy receiving surface for conversion to heat energy which is constructed and arranged to provide a modular unit having a base and a plurality of collector module units angularly disposed to module base. The collector units are adjacently disposed to form a plurality of hollow structures each having a surface or surfaces angularly disposed to the base of the modular unit to provide for transmission of incident solar energy to the energy receiving surface. Preferably the structure is formed of four transparent surfaces wherein at least three surfaces have a common vertex. The invention also provides for a plurality of reflective surfaces angularly disposed to the modular base where a combination of transparent and reflective surfaces provide for optimum collection of the radiant energy. The reflective surfaces are angularly disposed to reflect incident solar energy to an adjacent transparent surface for transmission to the energy receiving surface. Where transparent and reflective surfaces are employed to form the modular collector unit the transparent surfaces and reflective surfaces are adjacently disposed to form a plurality of structures having a common base and wherein at least three surfaces have a common apex. The structures preferably take the form of a hollow geometric pyramid having three or more sides to provide for transparent and/or reflective surfaces. An important feature of this concept of the invention is that the surfaces forming the collector unit can be varied in size as well as the angular relationship of the surfaces to each other and to the modular base to provide for maximum collection of radiant energy. The shape of the transparent and reflective surfaces is preferably flat where a pyramidal configuration is employed, but may be curved in order to achieve maximum efficiency of collecting radiant solar energy. The invention provides an apparatus for collecting radiant solar energy regardless of the angle or direction of the structure that it is positioned upon.

The invention accordingly comprises the apparatus possessing the construction, combination of elements and arrangement of parts which are exemplified in this disclosure and the scope and application of which will be indicated in the claims.

DESCRIPTION OF PREFERRED EMBODIMENTS

For a fuller understanding of the nature and desired objects of the invention, reference should be had to the following detailed description taken in connection with the accompanying drawings wherein like reference characters denote corresponding parts throughout the several views and wherein.

Figure 1:
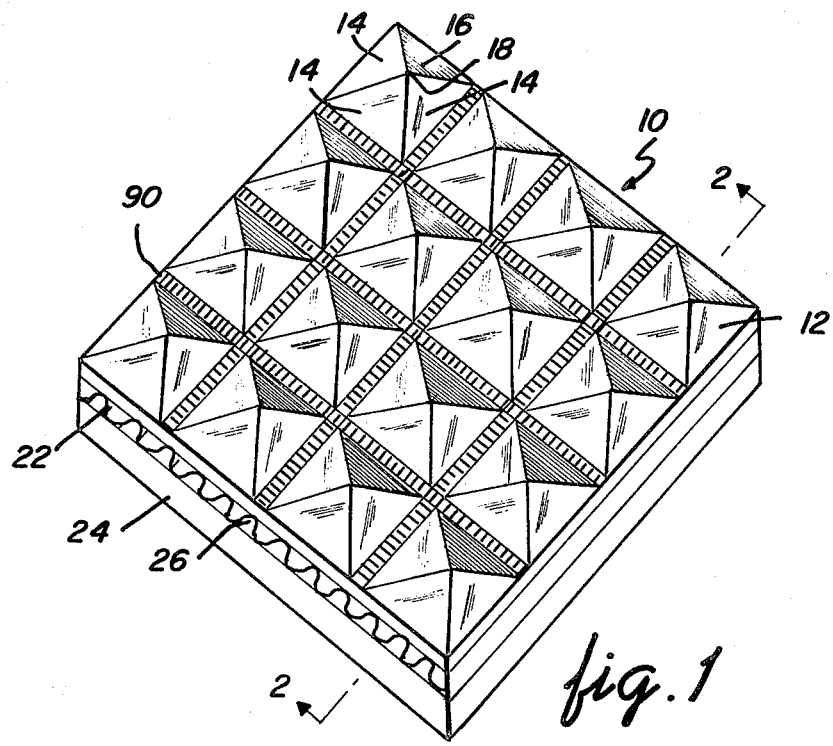
FIG. 1 is a partially diagrammatic perspective view of an embodiment of the invention illustrating a solar energy collector module assembly having a plurality of collecting units each having transparent and reflective surfaces.
Figure 2:
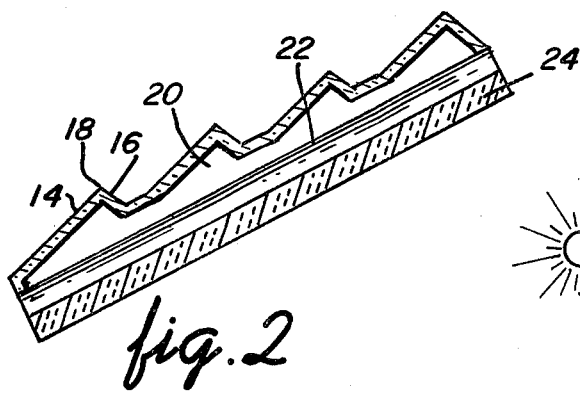
FIG. 2 is a sectional view taken through 2—2 of FIG. 1 and illustrating the angular disposition of the surfaces.

Referring now to FIGS. 1 and 2 of the drawing, there is shown generally at 10 a solar energy collector module of the present invention having a plurality of collecting units 12, each having three transparent surfaces 14 and one reflector surface 16. The collector units 12 are shown in the shape of a pyramid with four sides having a common apex 18 and defining a space 20. The transparent surfaces 14 and reflector surfaces 16 are triangular in shape. As particularly illustrated in FIG. 2 the transparent surfaces and the reflector surfaces are disposed at an angle to the energy receiving means 22. The size of the angle for each surface 14 and 16 with respect to the energy receiving means 22 can be varied as a function of the pitch of the surface to which the collecting module is attached and the direction of such surface to the radiant energy source as will be discussed hereinafter. The energy receiving surface also serves as a heat exchanger. Positioned adjacent the energy receiving surface is an insulation layer 24 to prevent heat loss through the bottom of the module assembly.

In the preferred embodiment the modular units 12 are formed of a plastic material, such as a clear acrylic plastic which will transmit radiant energy and reduce heat loss by conduction and convection. Additionally, the plastic material is of a type that can be moulded in sheet form to provide a collecting module containing a plurality of collector module units. Such moulding operations are well known to those skilled in the art. In this manner the collecting module 10 and module units 12 are formed of one continuous integral structure.

In the preferred embodiment the reflector surfaces are provided by applying a reflective coating to the surfaces designated as reflective surfaces. Such reflective coating may be selected from the group consisting of reflective paints and reflective metallic coatings. Such metallic coatings can be applied, for example, by vacuum vapor deposition upon the modular units after such units have been properly masked, as is well known by those skilled in the art.

In another embodiment of the invention the reflective material may consist of a thin flexible sheet of plastic material such as mylar upon which has been applied a thin coating of reflective metal. Such sheet can be adhesively applied to the surfaces to be employed as reflective surfaces.

The insulation means 24 can be formed of a plastic material such as styrofoam. Other suitable materials such as fiberglass, wood, and asbestos can also be used. The insulation 24 serves to insulate the structure (roof, for example) from transfer of heat from the collecting module, and the loss of heat from the energy receiving means 22 through the bottom of the collecting module.

The energy receiving surface 22 is formed of a material which will absorb radiant energy or light energy and convert it to thermal energy or heat energy and convert such thermal energy to a heat exchange fluid. In FIGS. 1 and 2 the energy receiving surface 22 is a sheet of metal such as stainless steel, aluminum or copper corrugated to provide channels 26 through which the heat exchange fluid is passed. The upper surface is provided with a dull black coat to promote absorption of the solar radiant energy. The black coating can, for example, be provided by a black paint or a layer of carbon black.

Figure 3:
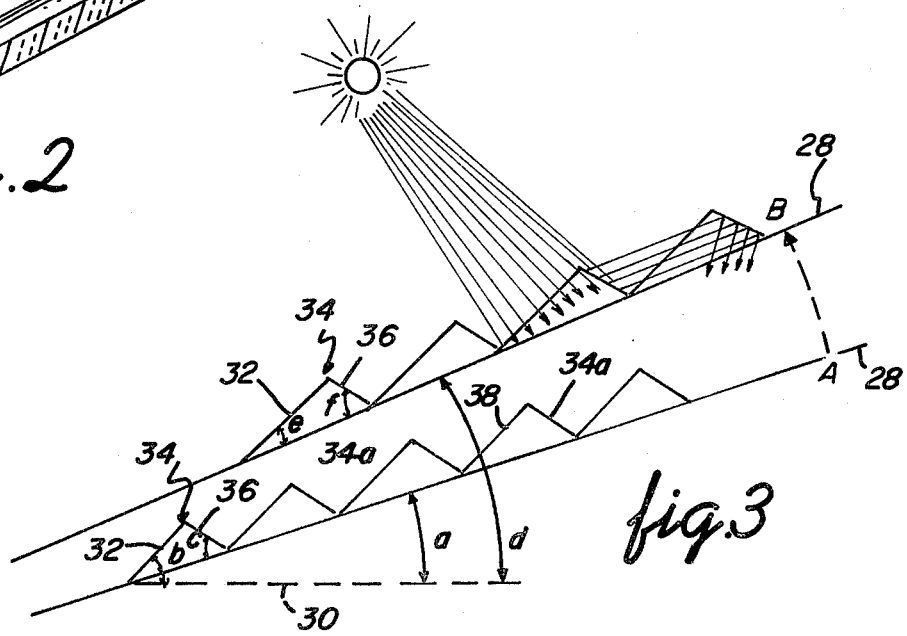
FIG. 3 is a diagrammatic view illustrating the change in angular disposition of the transparent and reflective surfaces as the angle of support is changed with respect to horizontal or level.

Referring now to FIG. 3 of the drawing there is illustrated the change in angular disposition of the transparent and reflective surfaces as the angle or pitch of the supporting structure is changed or varied with respect to level or horizontal. As shown in FIG. 3 supporting structure 28 is positioned at an angle $a$ from line 30 representing horizontal. Transparent surface 32 of modular unit 34 is then preferably disposed at angle $b$ from the supporting structure 28 so that the sum of angles $a$ and $b$ is 45° where such angle is optimum with respect to incident solar radiation. The angle $c$ of reflector surface 36 is selected to provide reflection of incident radiant energy 40 to the transparent surface 38 of the adjacent module unit 34a. When a supporting structure 28 is moved from position A to position B to represent a greater angle $d$ with respect to the horizontal 30 than angle $a$ then angle $e$ of transparent surface 32 is reduced to maintain the angular relationship as at position A. Similarly angle $f$ is increased to maintain optimum reflection of radiant energy 40 from reflector surface 36 to adjacent transparent surface 38. In position B the sum of angles $d$ and $e$ is 45° where such angle is optimum for incident solar radiation. It is to be understood that while the foregoing angular relationship has been described with respect to 45°, it is not to be considered a critical feature of the invention but an optimum angular relationship.

Figure 4:
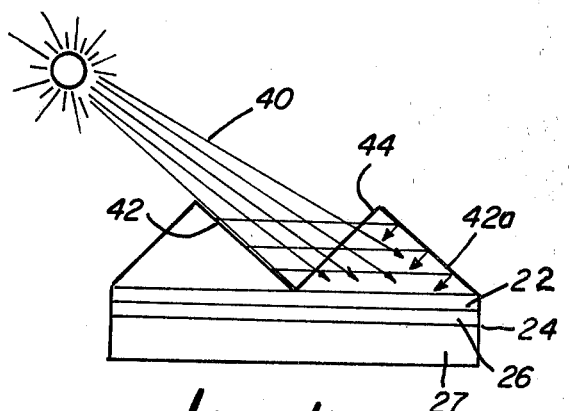
FIG. 4 is a diagrammatic representation in section of apparatus constructed in accordance with the present invention and illustrating the relationship between the transparent surfaces and the reflective surfaces.

FIG. 4 illustrates the relationship between the transparent and reflector surfaces. It is seen that radiant energy 40 strikes reflector surface 42 and is reflected to adjacent transparent surface 44 and transmitted onto energy receiving means 22. A portion of the radiant energy is reflected by reflector surface 42a back to the energy receiving means 22 below reflector surface 42a.

Figure 5:
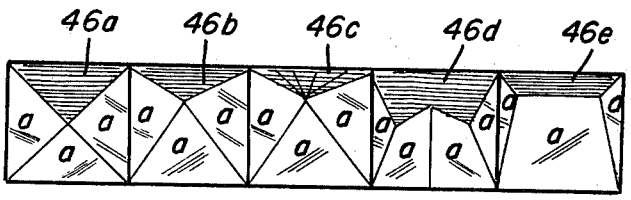
FIG. 5 is a top plan view of five embodiments of the collector units illustrating pyramidal type collector units within the scope of the invention.

In FIG. 5 there is illustrated five embodiments of the collecting module units 46a, 46b, 46c, 46d, and 46e, of the present invention showing various configurations and arrangements of surfaces to achieve optimum collection of radiant energy depending on the angle (pitch) and direction of supporting structure. In this illustration the transparent surfaces are indicated by a, the remaining surfaces being reflective surfaces.

In the preferred embodiment there are three transparent surfaces and one reflector surface when the module unit has at least four surfaces.

Figure 6:
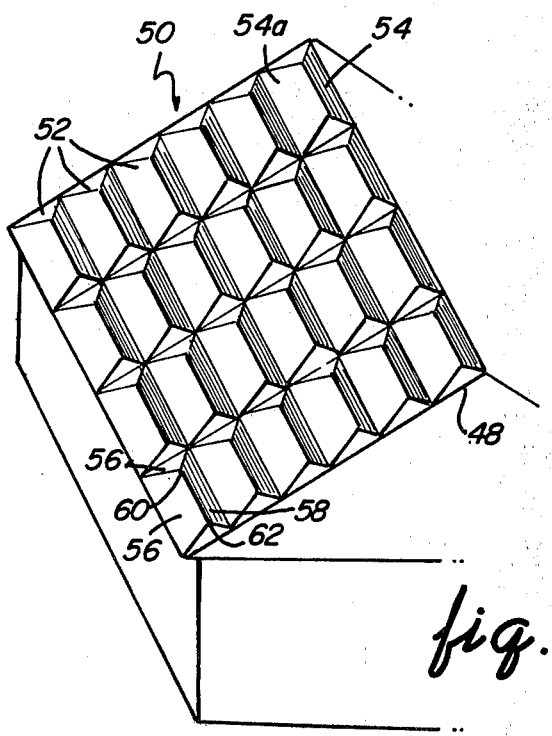
FIG. 6 is a combination of a partially diagrammatic sectional and partially plan view illustrating modular collector with a plurality of collector units as applied to a roof structure.

In FIG. 6 there is illustrated an embodiment of the module units of the present invention as applied to a roof structure. In this illustration the collection module indicated generally at 50 is shown positioned on a roof structure 48. The collection module 50 consists of a plurality of module units 52. Each of the module units 52 is an elongated structure having a rectangular base and four sides including two elongated surfaces 54 and 54a. Each of the module units 52 is provided with three transparent surfaces 56, one reflective surface 58, and two apexes 60 and 62. This collection module 50 is particularly suitable for structures built in a north-south direction whereby both transparent and reflective surfaces are in the path of radiant solar energy for a greater period of time thereby increasing the radiant energy collected and transmitted to the energy receiving surface.

Figure 7:
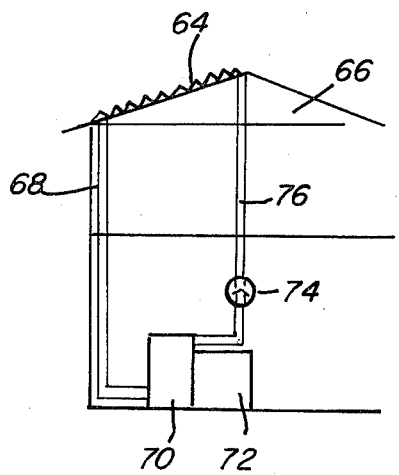
FIG. 7 is a diagrammatic sectional view of the invention as applied to a solar energy system for a building.

Referring now to FIG. 7 there is shown a collecting module 64 constructed, for example, as illustrated in FIGS. 1 and 2 and attached to the roof of the structure indicated generally at 66. The collecting module 64 is connected by conduit 68 to heat storage tank 70. Heat storage tank 70 is connected to solar heat exchanger 72. A heat exchange fluid such as a solution consisting of water and anti-freeze is pumped by pump 74 to the heat exchange conduits associated with the collecting module 64 where it is heated by transmitted solar radiant energy. The fluid then flows through conduit 68 to heat storage tank 70 and then to heat exchanger 72 where the thermal energy is utilized in the form of heated air, for example, to heat the structure by means (not shown) well known to those skilled in the art. The fluid is then recirculated via pump 74 and conduit 76 to be reheated by solar radiant energy.

Figure 9:
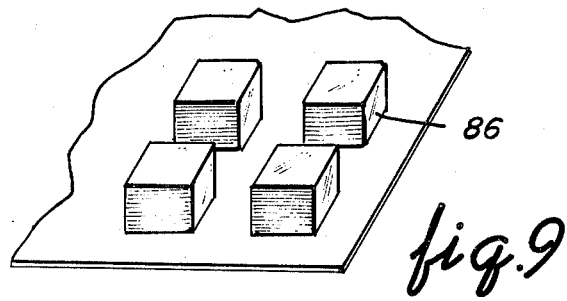
FIG. 9 is a fragmentary plan view of a modified embodiment of the collector unit in accordance with the present invention.
Figure 10:
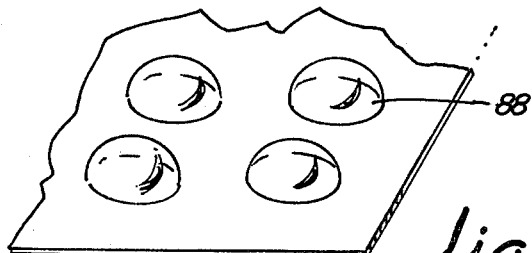
FIG. 10 is a fragmentary plan view of a modified embodiment of the collector unit in accordance with the present invention.

Referring now to FIGS. 9 and 10 there is illustrated modified embodiments of the collector module unit. In FIG. 9 the collector unit 86 is square in configuration. In FIG. 10 the collector unit 88 is dome shaped.

Figure 8:
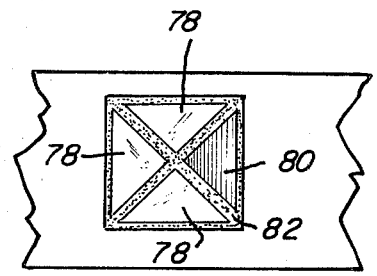
FIG. 8 is a fragmentary plan view of a modified embodiment of the collector unit in accordance with the present invention.

It is to be understood that while the invention has been described with respect to preferred embodiments thereof, modification may be made within the scope of the invention. For example, the collector units of a collecting module can be disposed and positioned in a staggered manner rather than in rows. Additionally, module units can be constructed and arranged to provide a double layer (not shown) of the collector unit surfaces thereby providing greater thermal insulation where the heat exchange fluid is a gas, for example, such as air. Also, referring now to FIG. 8, the module unit can be constructed of individual transparent surfaces 78 and reflective surface 80 held in position by a suitable frame means 82 on support means 84. In this embodiment of the invention the individual surfaces 78 and 80 and frame means 82 are constructed and arranged so that each surface can be replaced should any damage occur. Also, the transparent and reflective surfaces can be constructed of material such as glass. Also, when the collecting module 10 of FIG. 1 is constructed of an integral material, such as plastic, the space between module units 12 can be corrugated in form as shown at 90 of FIG. 1 to provide added strength to the collecting module. Additionally, the energy receiving surface may consist of a sheet of heat conducting metal, such as aluminum, stainless steel, or copper, with its upper surface coated black to promote absorption of the solar radiant energy. In this case, the heat exchanger may consist of metal tubing, such as stainless steel or copper tubing, positioned in heat transfer relationship to the energy receiving surface whereby a heat exchange fluid conducted through the tubing is heated.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. An apparatus for collecting radiant solar energy upon an energy receiving means for conversion to heat energy comprising a solar energy collecting module, said module having a base and a plurality of radiant energy transparent means angularly disposed to said base for transmitting radiant energy to said energy receiving means for conversion to heat energy, and a plurality of reflective means angularly disposed to said base and adjacent said transparent means to reflect incident radiant energy to an adjacent transparent surface for transmission to said energy receiving means, said transparent and reflective surfaces forming a plurality of discrete structures having a common base and at least one reflective surface, and means for transfer of said heat energy to a heat exchange fluid.

2. An apparatus for collecting radiant solar energy and directing said energy upon an energy receiving means for conversion to heat energy comprising a plurality of solar energy collecting modular units, each of said units having radiant energy transparent means and reflective means, said transparent means being angularly disposed to said energy receiving means to transmit radiant solar energy to said energy receiving means, said reflective means being angularly disposed to said energy receiving means and the transparent means of an adjacent modular unit whereby radiant energy is reflected to the transparent means of said adjacent modular unit for transmission to said energy receiving means, means for holding said transparent means and said reflective means in spaced relationship to each other and about said energy receiving means, and means for transfer of said heat energy to a heat exchange fluid.

3. An apparatus for collecting radiant solar energy upon an energy receiving means for conversion to heat energy comprising a solar energy collection module, said module having a base and a plurality of module units disposed about said base, each said module unit having at least three radiant energy transparent surfaces to receive incident solar energy about said surfaces and transmit said energy to said energy receiving means for conversion to heat energy, said transparent surfaces having a common base and forming a module unit having a continuous integral structure with other module units and said module base, and means for transfer of said heat energy to a heat exchange fluid.

4. The apparatus of claim 3 wherein said raised modular units form a rectangular configuration.

5. An apparatus for collecting radiant solar energy upon an energy receiving means for conversion of radiant energy to heat energy constructed for disposition to horizontal comprising a solar energy collecting module, said module having a base and a plurality of radiant energy collecting module units angularly disposed to said module base, said module units having a plurality of radiant energy transparent surfaces to receive incident radiant energy and transmit said energy to said energy receiving means, said module units each having at least one said transparent surface disposed at an angle to said module base whereby the sum of the angle defined by said transparent surface and said module base and the angle defined by said module base and horizontal is a predetermined constant angle corresponding to the optimum angle for incident solar radiation.

* * * * *